W. G. SCHRÖDER.
PROCESS AND APPARATUS FOR FILLING VESSELS WITH MILK.
APPLICATION FILED MAY 24, 1915. RENEWED AUG. 22, 1917.
1,242,873.         Patented Oct. 9, 1917.
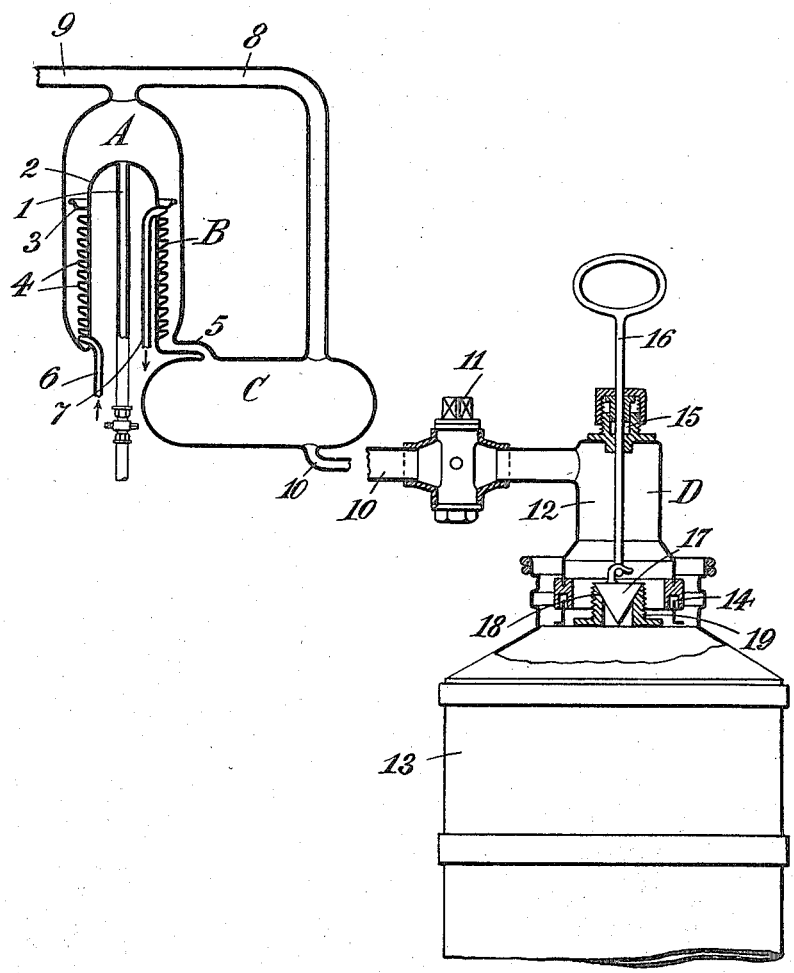
Inventor:
Wilhelm G. Schröder,
by Wilkinson, Guista & MacKaye,
Attorneys.

UNITED STATES PATENT OFFICE.

WILHELM GOTTHILF SCHRÖDER, OF LÜBECK, GERMANY.

PROCESS AND APPARATUS FOR FILLING VESSELS WITH MILK.

1,242,873. Specification of Letters Patent. Patented Oct. 9, 1917.

Application filed May 24, 1915, Serial No. 30,180. Renewed August 22, 1917. Serial No. 187,702.

*To all whom it may concern:*

Be it known that I, WILHELM GOTTHILF SCHRÖDER, manufacturer, a subject of the German Emperor, and resident of Luisenstrasse 41, in the free town of Lübeck, in the German Empire, have invented new and useful Improvements in the Process and Apparatus for Filling Vesels with Milk, of which the following is a specification.

My invention relates to improvements in the process of and in a device for filling up milk in vessels and has for its object to fill up the milk into great vessels of conveyance in such a manner that it will stand or remain in its proper state at least 8 to 14 days, so that the dairies are enabled to sell the milk or to use the same for any purposes independently of season and distances.

The new process consists in exposing the milk, having been pasteurized or homogenized and being brought in a thin layer within a vacuum, to the action of the same and to a refrigerating action so that it will be continuously deprived of its air content. By this way the vapors especially are carried away, which are a source of the cultivation of bacteria. The milk being treated in this way and being still under the action of the same vacuum is now conducted into the vessel of conveyance, which in the same place is also closed by absence of air. Therefore the milk coming from the sterilizing vessel does not come at all in touch with the air.

In the accompanying drawing a device of the new kind has been illustrated in a sectional view on a strongly reduced scale; the colsing device is shown on a scale being less diminished.

In the hollow chamber A a surface refrigerator or cooler B is situated. With the chamber A a chamber C is brought in communication, which serves for receiving the milk flowing out of the cooler B and from which the milk in passing the closing device D is filled up in the absence of air into suitable milk cans and closed air tight.

The milk to be treated flows in measured quantities through the pipe 1 upon the distributing surface 2, over which it runs in the form of thin streams or layers into the sieve cup 3, by means of which it will be distributed into a fine drizzling or spray extending over the whole refrigerating surface 4, so that the milk flows off in a cooled temperature through the pipe 5 into the chamber C. For effecting the cooling a water supply pipe 6 and a water delivery pipe 7 is provided. Both chambers A and C are connected with each other by means of a pipe 8, which is attached at 9 to an air sucking pump, not shown in the drawing. By means of this pump a state of vacuum can be created in both chambers A and C. By this way the air will be sucked off from the thin flowing milk stream on the rounded upper part 2 through the pipe 8 by means of the air pump while the milk is kept under vacuum.

To the lower side of the chamber C a delivery pipe 10 is attached, which can be shut off by the cock 11 or the like. With this cock an apparatus 12 is combined, on to the lower side of which the milk can 13 can be pressed by means of a leverage device or the like, not shown in the drawing, in such a manner, that the rubber package 14 closes air tight with the closure D. On the latter a stuffing box 15 is situated, through which a rod 16 is guided. The lower end of this rod carries a valve cone 17, which fits into the seat 18 being provided on the top of the milk can and may be lifted off the latter by pulling upward the rod 16.

Now when the cock 11 is turned on in its opened position and the cone 17 is lifted by means of the rod 16, the can will be filled up with milk. As soon as this has been done, the cone 17 is returned again on to its seat 18. The hook on the lower end of the rod 16 may be disengaged from the cone 17 by turning the rod around its axis, whereupon the cone rests on the top of the milk can and closes the same air tight. At last a cap being screw threaded inside may be screwed on to the outside thread 19 of the said seat for securing the closure of the milk can which is now closed air tight and ready for its transport in such a manner, that the milk having been deprived of its airy content appears to be perfectly suitable as well with regard to hygenics as for. conveying purposes, that is to say, it remains durable for some time, namely for about 8 to 14 days, without to sterilize.

I claim:

1. A process of making durable milk characterized by the fact that the milk, after being pasteurized or homogenized is then passed through a surface cooler within a chamber under a vacuum until the vapor developing in the milk is sucked off, whereupon the milk still being under action of the vacuum is guided into a chamber also under a vacuum, and from said chamber is allowed to flow into the vessel of conveyance or milk can, in which it is closed tight.

2. An apparatus for carrying out the herein described process, comprising a surface cooler situated within a closed chamber, a collecting chamber connected to said closed chamber, and means for maintaining a vacuum within both chambers and for simultaneously carrying off the vapor arising from the milk.

In testimony that I claim the foregoing as my invention, I have signed my name in presence of two witnesses, this twenty-second day of April, 1915.

WILHELM GOTTHILF SCHRÖDER.

Witnesses:
JOHN WULF,
OTTO OLDENBURG.